US008322873B2

(12) United States Patent
Glovatsky et al.

(10) Patent No.: US 8,322,873 B2
(45) Date of Patent: Dec. 4, 2012

(54) LIGHTING SYSTEM FOR APPLIANCE

(75) Inventors: Andrew Z. Glovatsky, Plymouth, MI (US); Christopher W. Gattis, Livonia, MI (US)

(73) Assignees: Varroccorp Holding BV (NL); Varroc Engineering Private Limited (IN); Varroc Lighting Systems S.R.O. (CZ)

( * ) Notice: Subject to any disclaimer, the term of this patent is extended or adjusted under 35 U.S.C. 154(b) by 52 days.

(21) Appl. No.: 12/938,546

(22) Filed: Nov. 3, 2010

(65) Prior Publication Data

US 2012/0106129 A1 May 3, 2012

(51) Int. Cl.
F21V 33/00 (2006.01)
F21V 7/04 (2006.01)

(52) U.S. Cl. ........ 362/92; 362/27; 362/249.02; 362/608

(58) Field of Classification Search .................... 362/92, 362/125, 126, 154, 600, 602, 604, 609, 612, 362/613, 249.301, 249.02, 608, 611, 26, 362/27
See application file for complete search history.

(56) References Cited

U.S. PATENT DOCUMENTS

| | | | |
|---|---|---|---|
| 3,612,848 A | 10/1971 | Koch et al. | |
| 4,799,133 A | 1/1989 | Strzalko et al. | |
| 5,287,252 A | 2/1994 | Caruso | |
| 5,453,855 A * | 9/1995 | Nakamura et al. | 349/58 |
| 5,461,547 A | 10/1995 | Ciupke et al. | |
| 6,042,244 A | 3/2000 | Witkoski | |
| 6,123,431 A * | 9/2000 | Teragaki et al. | 362/625 |
| 6,179,434 B1 * | 1/2001 | Saraiji | 362/125 |
| 6,210,013 B1 | 4/2001 | Bousfield | |
| 6,558,017 B1 * | 5/2003 | Saraiji et al. | 362/125 |
| 6,726,341 B2 | 4/2004 | Pashley et al. | |
| 6,786,562 B2 * | 9/2004 | Obrock et al. | 312/408 |
| 6,908,204 B2 | 6/2005 | Kraft | |
| 7,201,487 B2 | 4/2007 | Pinter | |
| 7,338,180 B2 | 3/2008 | Wing | |
| 7,360,937 B2 * | 4/2008 | Han et al. | 362/608 |
| 7,413,321 B2 | 8/2008 | Kim | |
| 7,434,951 B2 * | 10/2008 | Bienick | 362/92 |
| 7,513,637 B2 * | 4/2009 | Kelly et al. | 362/126 |
| 7,628,525 B2 * | 12/2009 | Lee et al. | 362/602 |
| 7,703,970 B2 * | 4/2010 | Blach | 362/609 |
| 7,731,381 B2 * | 6/2010 | Littau et al. | 362/125 |
| 7,806,543 B2 * | 10/2010 | Swofford et al. | 362/92 |
| 7,871,176 B2 * | 1/2011 | Kelly et al. | 362/126 |
| 7,976,181 B2 * | 7/2011 | Kelly et al. | 362/217.12 |
| 8,021,009 B2 * | 9/2011 | Knoll et al. | 362/92 |
| 2004/0062031 A1 | 4/2004 | Pinter | |
| 2004/0264160 A1 | 12/2004 | Bienick | |
| 2005/0174804 A1 * | 8/2005 | Blanc | 362/613 |
| 2005/0185395 A1 | 8/2005 | Pinter | |
| 2007/0127229 A1 * | 6/2007 | Lee et al. | 362/92 |
| 2008/0144333 A1 | 6/2008 | Gourlay | |
| 2008/0236183 A1 * | 10/2008 | Iimura | 62/264 |
| 2009/0021927 A1 * | 1/2009 | Hall et al. | 362/92 |
| 2009/0290338 A1 | 11/2009 | Heller et al. | |

* cited by examiner

Primary Examiner — John A Ward
(74) Attorney, Agent, or Firm — Cantor Colburn LLP

(57) ABSTRACT

A lighting system for an appliance is disclosed. In one embodiment, the lighting system includes a light shelf including a substantially planar light guide having a support member for releaseably coupling the light shelf to the appliance, a light injector coupled to a first end the light shelf, the light injector including a substrate having at least one light source disposed thereon and a housing for at least partially enclosing the at least one light source, wherein light emitted from the at least one light source is directed into the light guide, and an end piece coupled to a second end of the light shelf opposite the first end.

20 Claims, 9 Drawing Sheets

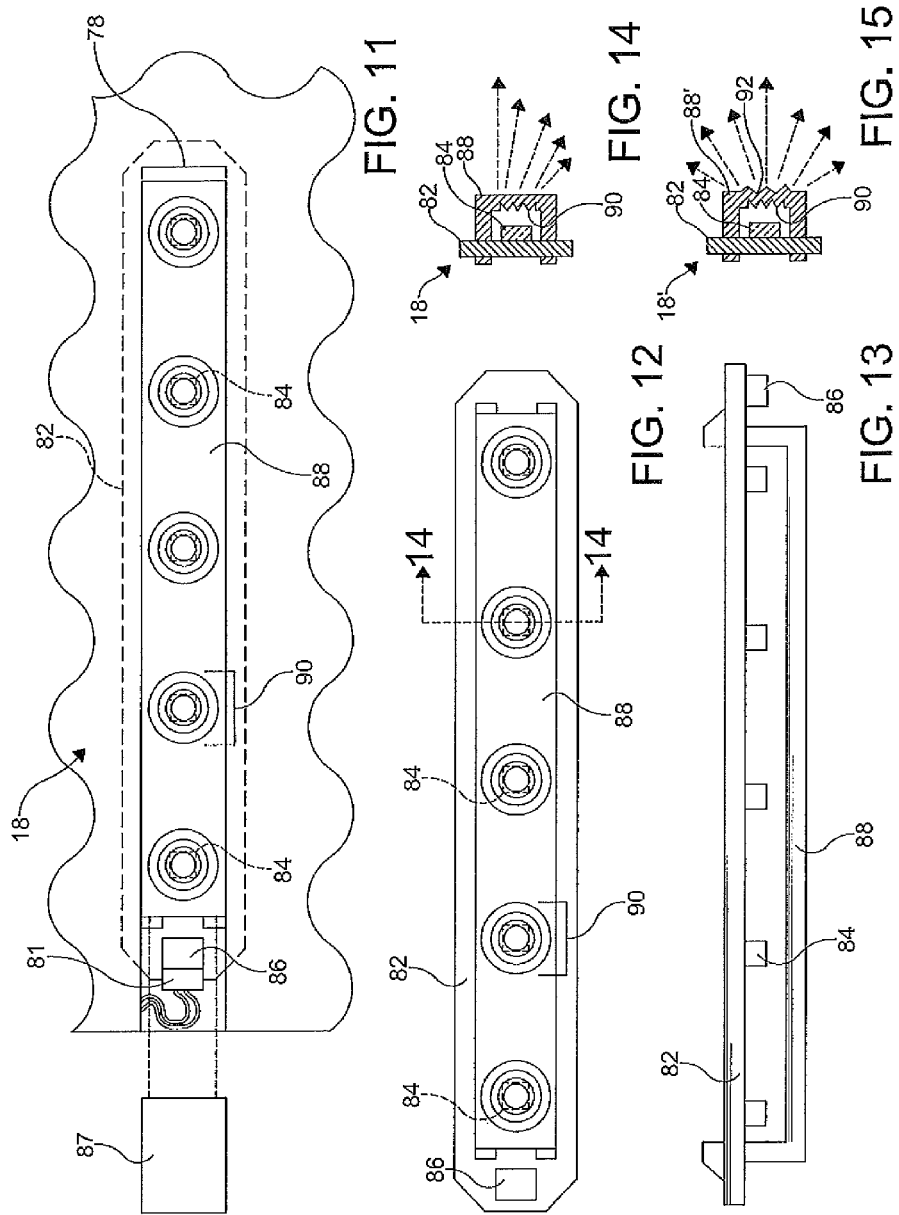

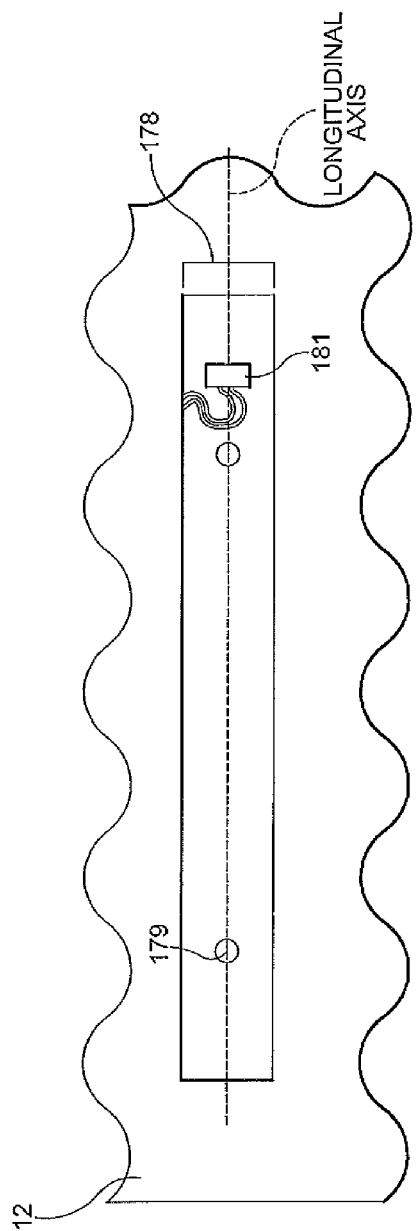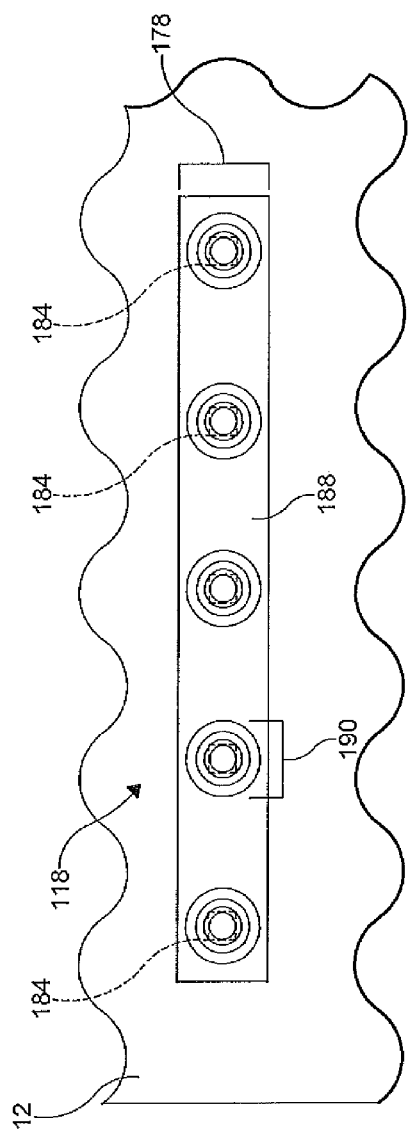

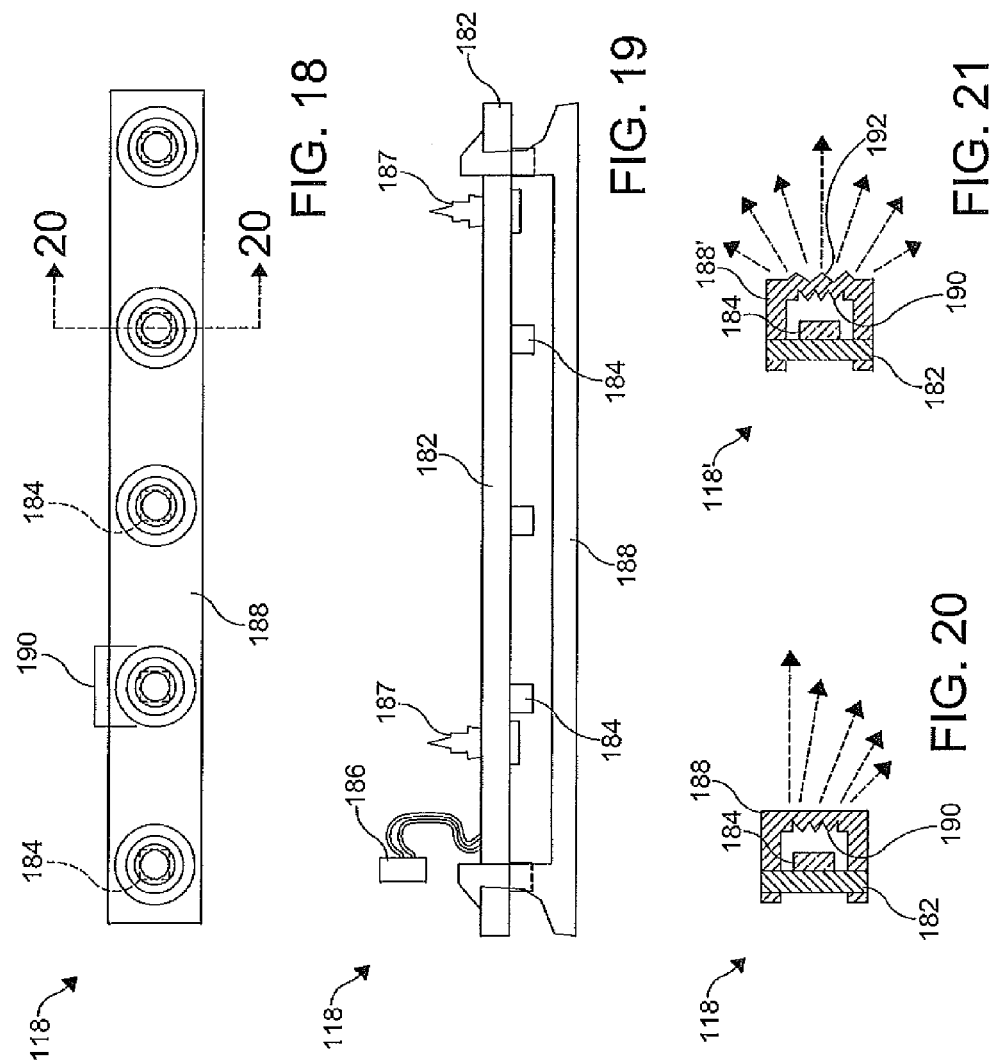

LIGHTING SYSTEM FOR APPLIANCE

FIELD OF THE INVENTION

The present invention relates generally to a lighting system. In particular, the invention is directed to a lighting system for an appliance such as a refrigerator, for example.

BACKGROUND OF THE INVENTION

Appliances such as refrigerators and freezers have poor lighting that does not illuminate objects near the rear of a shelf. Light is typically presented to an interior cavity of the appliance from a ceiling mounted lamp. The light from the ceiling mounted lamp does not filter down to the lower shelves due to objects on higher shelves that block the light. Thus, it is difficult to see what items are on lower shelves and at the rear of most shelves.

Specifically, current lighting systems for appliances do not provide a sufficient lighting of items along a length (e.g. depth) of a shelf in an appliance (e.g. refrigerator, freezer). Current lighting systems for appliances do not provide a comprehensive lighting of an interior of the appliance. Additionally, there is always a desire to reduce electrical power consumption in appliances.

It would be desirable to develop a lighting system for an appliance including optical features and lighting assemblies to provide selective lighting patterns throughout the appliance while minimizing electrical power consumption.

SUMMARY OF THE INVENTION

Concordant and consistent with the present invention, a lighting system for an appliance including optical features and lighting assemblies to provide selective lighting patterns throughout the appliance while minimizing electrical power consumption, has surprisingly been discovered.

In one embodiment, a lighting system for an appliance comprises: a light shelf including a substantially planar light guide having a support member for releaseably coupling the light shelf to the appliance; a light injector coupled to a first end the light shelf, the light injector including a substrate having at least one light source disposed thereon and a housing for at least partially enclosing the at least one light source, wherein light emitted from the at least one light source is directed into the light guide; and an end piece coupled to a second end of the light shelf opposite the first end.

In another embodiment, a lighting system for an appliance comprises: a substantially planar light guide disposed adjacent a portion of the appliance, wherein the light guide includes at least one first optical feature disposed on a first surface of the light guide to direct light exiting from the light guide; a light source disposed adjacent a peripheral edge of the light guide to emit light into the light guide; and a housing disposed adjacent the light guide and enclosing at least a portion of the light guide, wherein light rays are emitted from the light guide through an unenclosed portion of the light guide.

In yet another embodiment, a lighting system for an appliance comprises: a locator slot formed in a portion of the appliance; and a lighting assembly disposed in the locator slot, the lighting assembly further comprising: a substrate disposed adjacent the locator slot; a light source coupled to the substrate; and an optical device coupled to the substrate and disposed adjacent the light source to receive light rays emitted by the light source and direct the light rays in a pre-determined lighting pattern.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 11 is a fragmentary side elevational view of the sidewall of FIG. 10B showing the second sidewall assembly with a cover plate exploded;

FIG. 12 is a side elevational of the second sidewall assembly shown in FIGS. 10B-11;

FIG. 13 is a top plan view of the second sidewall assembly of FIG. 12;

FIG. 14 is a cross-sectional view of the second sidewall assembly of FIG. 12, taken along line 14-14;

FIG. 15 is a cross-sectional view of a second sidewall assembly according to another embodiment of the present invention;

FIG. 16 is a fragmentary side elevational view of a sidewall of an appliance including a locator slot according to another embodiment of the present invention;

FIG. 17 is a fragmentary side elevational view of the sidewall of FIG. 16 showing a third sidewall assembly disposed in the locator slot according to another embodiment of the present invention;

FIG. 18 is a side elevational view of the third sidewall assembly shown in FIG. 17;

FIG. 19 is a top plan view of the third sidewall assembly of FIG. 18;

FIG. 20 is a cross-sectional view of the third sidewall assembly of FIG. 18 taken along line 20-20; and FIG. 21 is a cross-sectional view of a third sidewall assembly according to another embodiment of the present invention.

DETAILED DESCRIPTION OF EXEMPLARY EMBODIMENTS OF THE INVENTION

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
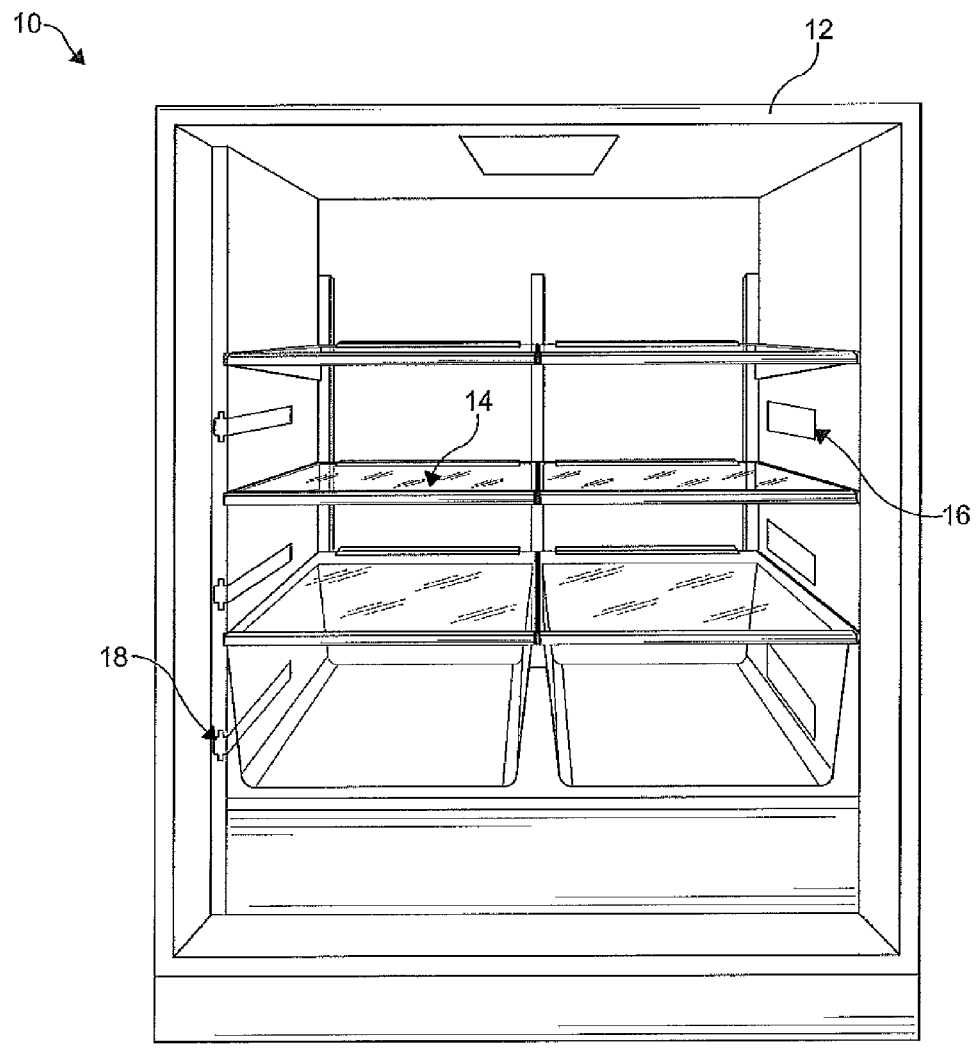
FIG. 1 is a front perspective view of an appliance including a lighting system according to the present invention.

FIG. 1 illustrates a lighting system 10 integrated with a surface (e.g. an interior wall) of an appliance 12 (e.g. a refrigerator) according to an embodiment of the present invention. As shown, the lighting system 10 includes a shelf assembly 14, a first sidewall assembly 16 (i.e. lighting assembly, light assembly), and a second sidewall assembly 18 (i.e. lighting assembly, light assembly). It is understood that other means of lighting an interior or exterior of the appliance 12 can be used in cooperation with the lighting system 10. It is further understood that any number and combination of the shelf assembly 14 and the sidewall assemblies 16, 18 can be used.

Figure 2:
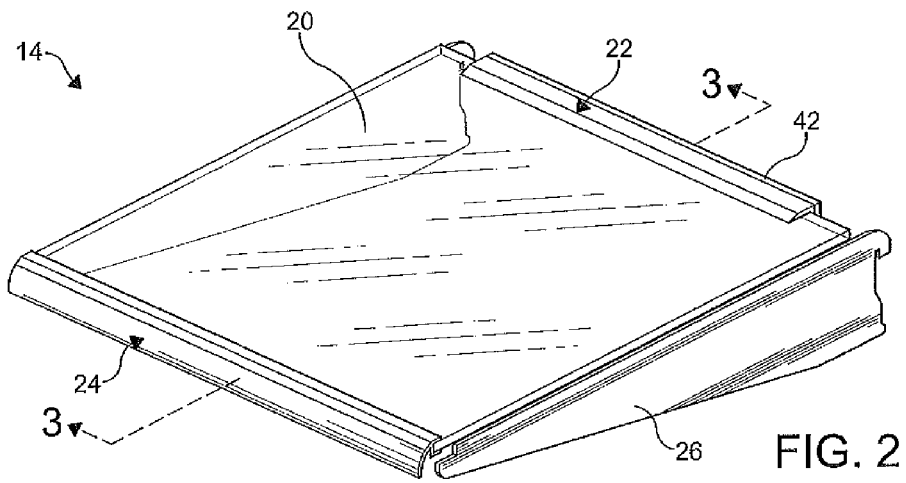
FIG. 2 is a side perspective view of a shelf assembly according to an embodiment of the present invention.
Figure 3:
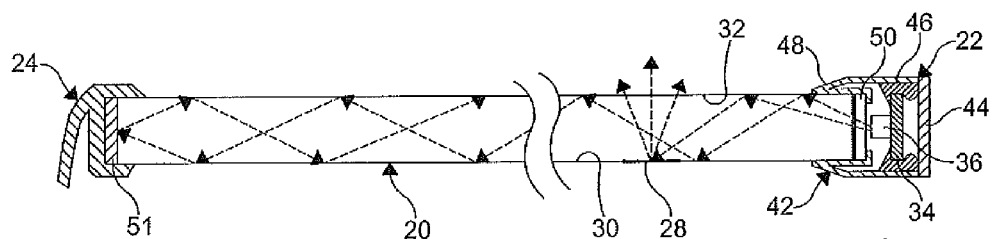
FIG. 3 is a cross-sectional view of the shelf assembly of FIG. 2 taken a along line 3-3.
Figure 4:
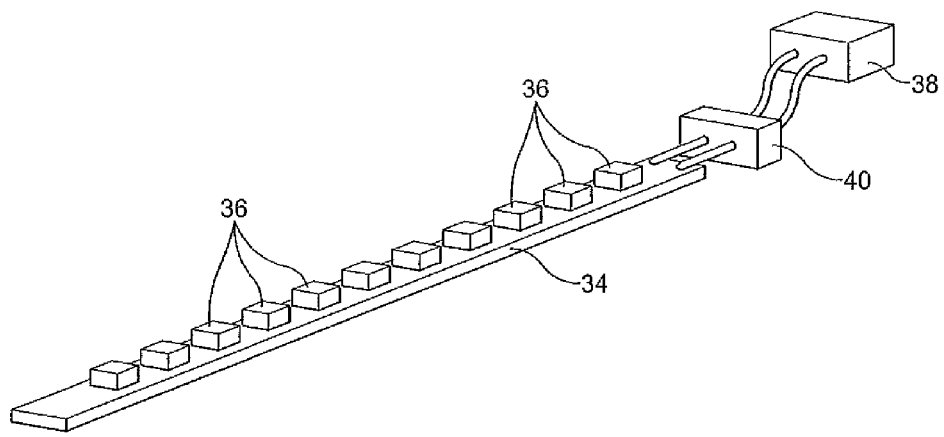
FIG. 4 is a perspective view of a portion of a light injector according to an embodiment of the present invention.

As more clearly shown in FIGS. 2-4, the shelf assembly 14 includes a light shelf 20, a light injector 22 coupled to the light shelf 20, and an end piece 24 coupled to the light shelf 20 and spaced from the light injector 22.

The light shelf 20 is typically a planar light guide having at least one support member 26 for releaseably coupling the light shelf 20 to an interior wall of the appliance 12. As a non-limiting example, the light shelf 20 is configured to couple to the appliance 12 using standard couplers for conventional shelving. The light shelf 20 is typically formed from glass or plastic. However, any material that allows light to be conducted therethrough by the principle of total internal reflection, can be used. As a non-limiting example, the light shelf 20 is formed from a composite (i.e. dual layer material) having a plastic under layer (not shown) coupled to a glass top layer (not shown). In certain embodiments, the light shelf 20 includes a plurality of light extraction features 28 disposed on a first surface 30 thereof to direct light through a second surface 32 opposite the first surface 30. As a non-limiting example, the light extraction features 28 can include a ridge or tooth formed in the light shelf 20 to direct light rays through the second surface 32 of the light shelf 20. As a further non-limiting example, the light extraction features 28 include a reflective paint for directing light rays through the second surface 32 of the light self 20. It is understood that the light extraction features 28 can include any means for re-directing light rays to exit the light shelf 20 through any surface thereof. It is further understood that the light extraction features 28 can be formed in or on any portion of the light shelf 20.

The light injector 22 is typically coupled to a peripheral edge of the light shelf 20 to direct light rays into the light shelf 20. The light injector 22 includes a substrate 34 (e.g. circuit board) having a plurality of light sources 36 (e.g. light emitting diodes) disposed thereon. The light sources 36 are in electrical communication with an electrical connector 38 to electrically couple the light sources 36 to a source of electrical energy (not shown). It is understood that any number of light sources 36 can be used. It is further understood that any means of electrical communication can be used to selectively energize the light sources 36 such as electrical wires having a protective grommet 40, for example.

In certain embodiments, a sealed housing 42 at least partially encloses the substrate 34 and facilitates the coupling of the substrate 34 to the light shelf 20, while substantially enclosing the light sources 36 for protection from damage. In certain embodiments, the housing 42 includes an end plate 44, a first coupling means 46 for releaseably coupling the substrate 34 to the housing 42 and a second coupling means 48 for releaseably coupling the housing 42 to the light shelf 20. As a non-limiting example, the first coupling means 46 is configured to receive the substrate 34 of the light injector 22 in a snap-fit manner. However, any means of releaseably securing the substrate 34 to the housing 42 can be used. As a further non-limiting example, the second coupling means 48 includes a plurality of spring armatures configured to engage the first surface 30 and the second surface 32 of the light shelf 20 in a spring-clip-like manner. Accordingly, a spring force of the spring armatures releaseably secures the housing 42 to the light shelf 20. However, any means releaseably securing the housing 42 to the light shelf 20 can be used.

In certain embodiments, an optical device 50 is coupled to at least one of the housing 42 and the light shelf 20 such that the optical device 50 is disposed between the light sources 36 and the light shelf 20 during use. The optical device 50 an be any device for directing light rays emitted from the light sources 36 into the light shelf 20 in a predetermined manner. As a non-limiting example, the optical device 50 is a lens securely coupled to a peripheral edge of the light shelf 20.

The end piece 24 is coupled to a peripheral edge of the light shelf 20 opposite the light injector 22 (e.g. opposite the optical device 50). In certain embodiments, the end piece 24 includes a reflector 51 disposed adjacent the light shelf 20 to constrain light rays from exiting a particular region (e.g. a front peripheral edge) of the light shelf 20. As a non-limiting example, the end piece 24 is releaseably coupled to the light shelf 20. However, the end piece 24 can be permanently coupled to the light shelf 20 or integrally formed therewith. As a further non-limiting example, the reflector 51 is coupled to at least one of the end piece 24 and the light shelf 20. It is understood that a conventional end piece used with conventional shelving can be configured to include the reflector 51.

Figure 5:
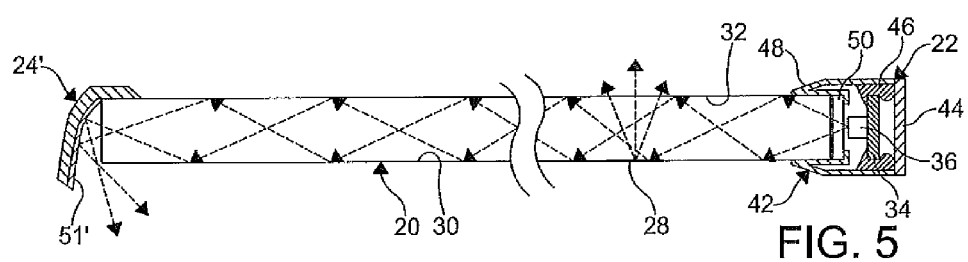
FIG. 5 is a cross-sectional view of a shelf assembly according to another embodiment of the present invention.

FIG. 5 illustrates an end piece 24' according to another embodiment of the present invention similar to the end piece 24, except as described below. As shown, the end piece 24' is coupled adjacent an end of the light shelf 20 opposite the light injector 22. The end piece 24' has a curved contour with a curved reflector 51' disposed on a surface facing the light shelf 20. Accordingly, as light rays exit the light shelf 20 adjacent the end piece 24', the light rays are reflected in a predetermined pattern (e.g. toward a portion of the appliance 12 below the light shelf 20 or a shelf below the light shelf 20). It is understood that the end piece 24' and the reflector 51' can have any shape and contour.

Figure 6:
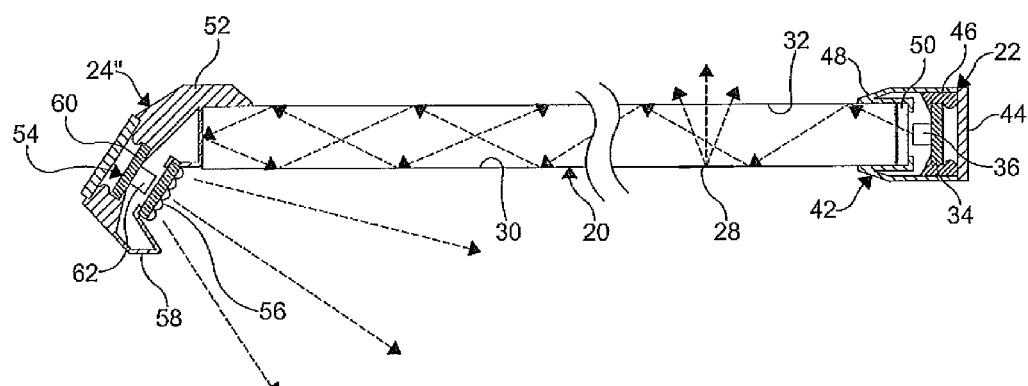
FIG. 6 is a cross-sectional view of a shelf assembly according to another embodiment of the present invention.

FIG. 6 illustrates an end piece 24" according to another embodiment of the present invention similar to the end piece 24, except as described below. As shown, the end piece 24" includes a main body 52, a light bar 54, and an optical element 56.

The main body 52 is typically coupled to the light shelf 20 and includes a first coupling feature 58 to receive and releaseably secure the light bar 54 to the end piece 24". As a non-limiting example, the light bar 54 is releaseably coupled to the main body 52 in a snap-fit manner. As a further non-limiting example, the main body 52 substantially encloses the light bar 54 for protecting the light bar 54 from damage.

In the embodiment shown, the light bar 54 includes a substrate 60 (e.g. circuit board) having a plurality of light sources 62 (e.g. light emitting diodes) disposed thereon. The light sources 62 are in electrical communication with an electrical connector (not shown) to electrically couple the light sources 62 to a source of electrical energy (not shown). It is understood that any number of light sources 62 can be used.

The optical element 56 is typically coupled to a portion of the main body 52 of the end piece 24" and disposed adjacent the light bar 54 to receive light rays emitted from the light sources 62. The optical element 56 can be any element such as a lens for directing the light rays emitted from the light sources 62 in a pre-determined pattern. As a non-limiting example, the optical element 56 directs light rays toward a portion of the appliance 12 below the light shelf 20 or a shelf below the light shelf 20. However, the optical element 56 can be configured to direct light rays in any pattern.

Figure 7:
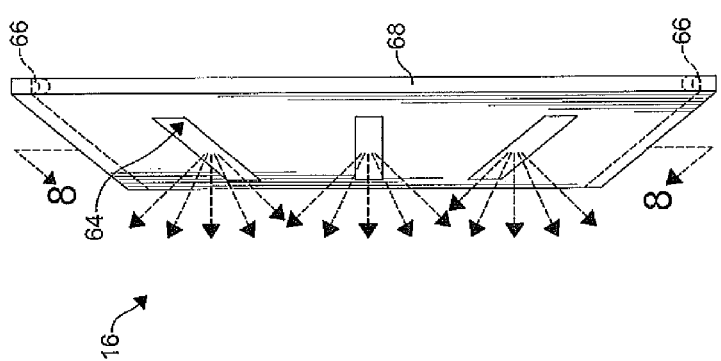
FIG. 7 is a perspective view of a first sidewall assembly according to an embodiment of the present invention
Figure 8:
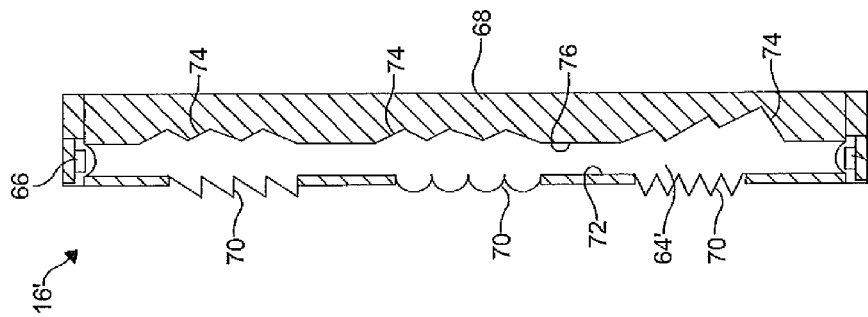
FIG. 8 is a cross-sectional view of the first sidewall assembly of FIG. 7 taken along line 8-8.

FIGS. 7-8 illustrate the first sidewall assembly 16 disposed in an interior of the appliance 12, according to an embodiment of the present invention. It is understood that the first sidewall assembly 16 can be disposed in any location and in any environment. As shown, the first sidewall assembly 16 includes a light guide 64 and at least one light source 66 disposed adjacent a peripheral edge of the light guide 64 to emit light into the light guide 64. In certain embodiments, the first sidewall assembly 16 includes a housing 68 enclosing at least a portion of the light guide 64, wherein only an unenclosed portion of the light guide 64 emits light rays into an interior of the appliance 12. In certain embodiments, the housing 68 is coupled (e.g. plastic molded) to the light guide 64. However, the housing 68 can also be embodied as a coating formed from plastic or paint. It is understood that the housing 68 can be configured to enclose any portion of the light guide 64. It is further understood that a portion (e.g. side wall) of the appliance 12 can be configured as the housing 68 to contain the light guide 64 and enclose a portion thereof.

The light guide 64 is substantially planar and includes a plurality of first optical features 70 (e.g. lenses, prismatic features, light extraction features, pillows, flutes, cubes, and the like) disposed (e.g. formed on or coupled to) a first surface 72 of the light guide 64. The first optical features 70 are typically unenclosed portions of the light guide 64 to facilitate the exit of the light rays from the light guide 64. It is understood that each of the first optical features 70 can be similar or different in order to provide a specific lighting pattern through various portions of the light guide 64. It is further understood that pre-defined configurations of the first optical features 70 can be used to provide an overall lighting pattern to illuminate an interior of the appliance 12.

In the embodiment shown, at least one of the light sources 66 is disposed adjacent opposite ends of the light guide 64. In certain embodiments, the light sources 66 are secured to the housing 68 to maintain a position relative to the light guide 64. However, as a non-limiting example, the light sources 66 can be coupled to the light guide 64. In certain embodiments, a portion of the light guide 64 adjacent the light sources 66 is configured to receive light rays emitted from each of the light sources 66. However, it is understood that an optical device can be disposed between the light sources 66 and the light guide 64 to direct light rays emitted from the light sources 66 into the light guide 64. It is further understood that electronic controls for the light sources 66 can be located on a board (not shown) supporting each of the light sources 66 or at a remote location in the appliance 12.

Figure 9:
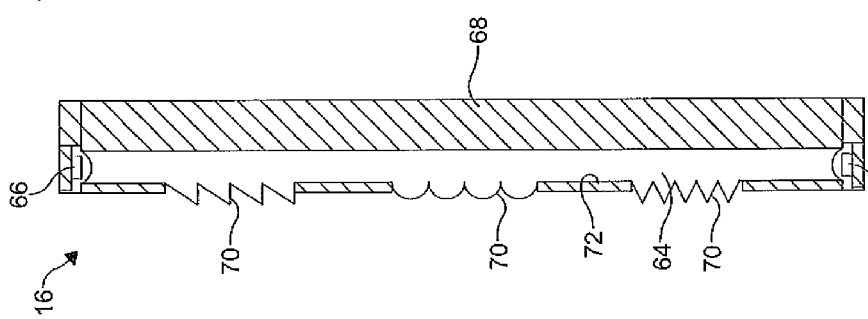
FIG. 9 is a cross-sectional view of a first sidewall assembly according to another embodiment of the present invention.
Figure 10A:
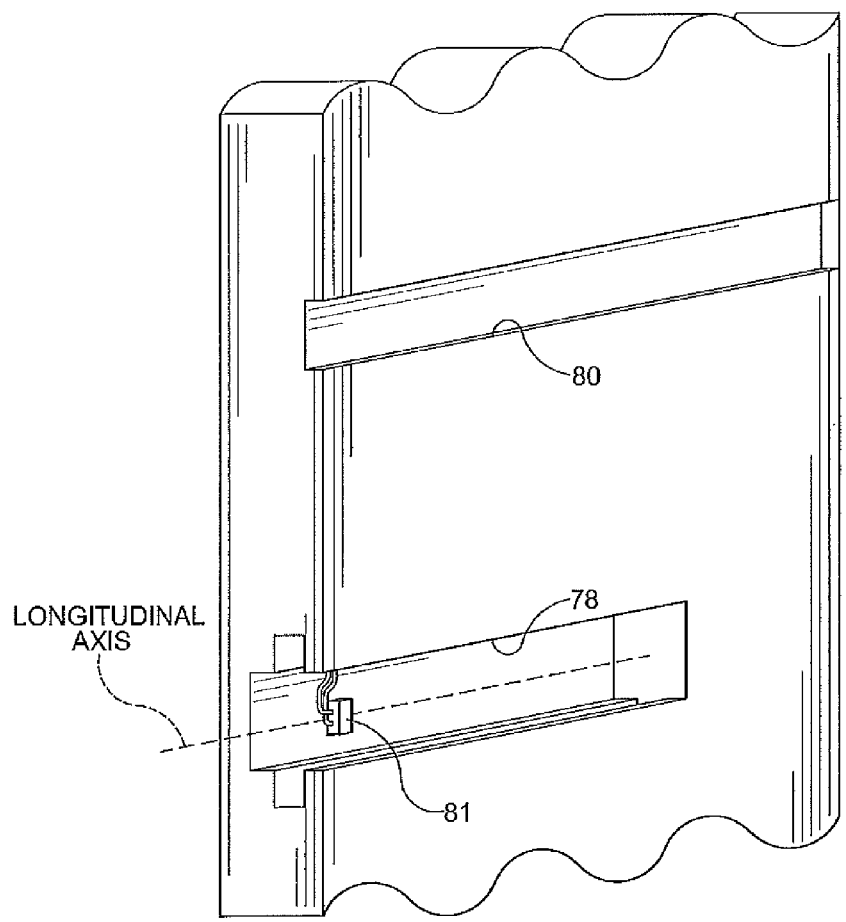
FIG. 10A is a fragmentary perspective view of a sidewall of an appliance including a locator slot according to an embodiment of the present invention.
Figure 10B:
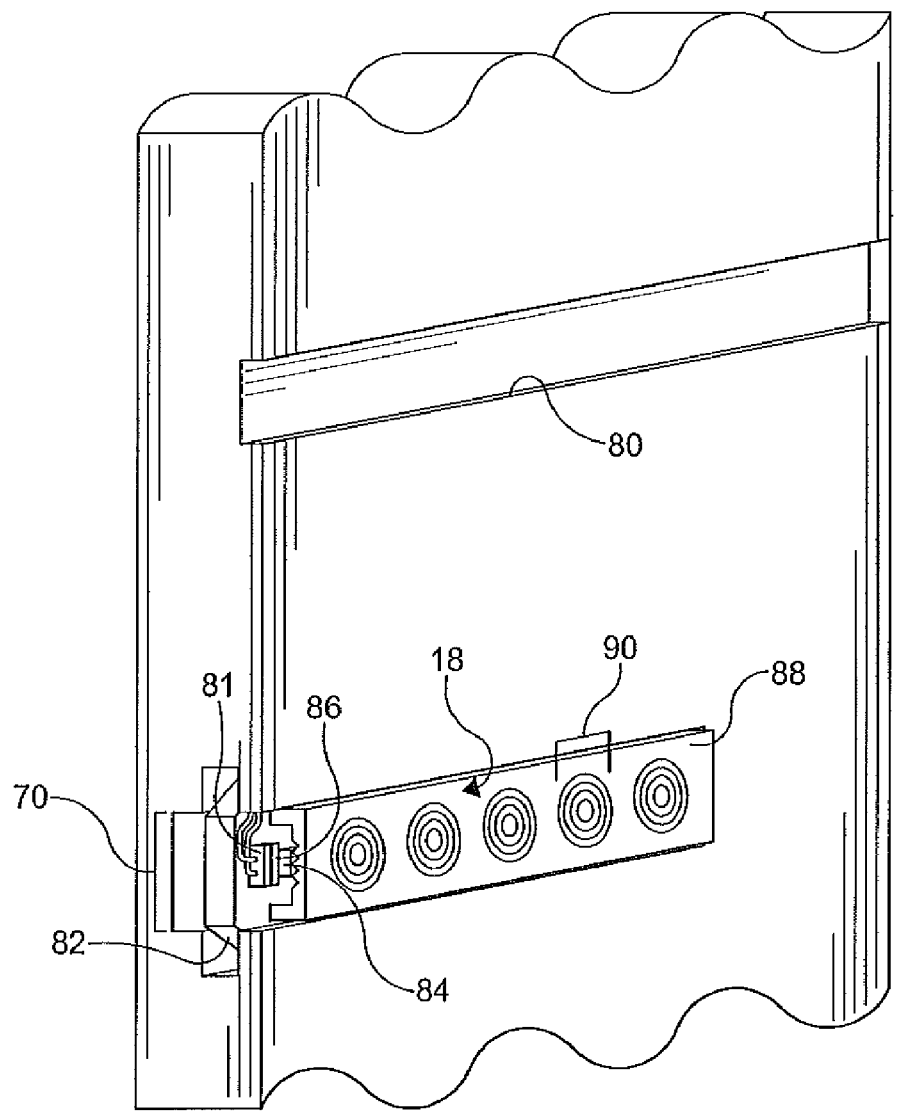
FIG. 10B is a fragmentary perspective view of the sidewall of FIG. 10A showing a second sidewall assembly disposed in the locator slot according to an embodiment of the present invention.

FIG. 9 illustrates a light guide 64' according to another embodiment of the present invention similar to the light guide 64, except as described below. As shown, the light guide 64' includes a plurality of second optical features 74 (e.g. lenses, prismatic features, light extraction features, pillows, flutes, cubes, and the like) disposed on (e.g. formed on or coupled to) a second surface 76 of the light guide 64' opposite the first surface 72. The second optical features 74 direct light rays toward the first optical features 70 disposed on the first surface 72 of the light guide 64'. It is understood that the second optical features 74 enhance the light being reflected/refracted to at least one of the first optical features 70.

FIGS. 10-15 illustrate the second sidewall assembly 18 according to an embodiment of the present invention. Typically, the second sidewall assembly 18 is disposed in a locator slot 78 (e.g. channel) formed in a sidewall of the appliance 12. However, it is understood that the second sidewall assembly 18 can be disposed in any location and in any environment. As a non-limiting example, the locator slot 78 is formed adjacent a shelf channel 80 conventionally formed in a sidewall of the appliance 12 to receive and secure a shelf (not shown) thereto. It is understood that the locator slot 78 can be positioned in any location in the appliance 12. It is further understood that the locator slot 78 can be formed in various wall designs and configurations (e.g. a single wall molding, a dual wall molding, etc.). As a non-limiting example, the locator slot 78 has a generally cross-shaped cross-section taken across a longitudinal axis thereof. As a further non-limiting example, an electrical interconnect 81 is disposed adjacent (e.g. in or nearby) the locator slot 78 to electrically couple the sidewall assembly 18 to a source of electrical energy (not shown) and other control components.

As more clearly shown in FIGS. 12-15, the second sidewall assembly 18 includes a substrate 82 (e.g. circuit board) having a plurality of light sources 84 (e.g. light emitting diodes) disposed thereon. The light sources 84 are in electrical communication with an electrical connector 86 to electrically couple the light sources 84 to a source of electrical energy (not shown). As a non-limiting example, the electrical interconnect 81 is coupled to the electrical connector 86 of the second sidewall assembly 18 to selectively energize the light sources 84. It is understood that any number of light sources 84 can be used. In certain embodiments, the substrate 82 includes a coupling feature (e.g. attachment clip) to secure the second sidewall assembly 18 to the appliance. In the embodiment shown, the substrate 82 of the second sidewall assembly 18 is configured to slide into the locator slot 78. As a non-limiting example, a cover plate 87 is disposed in the locator slot 78 adjacent the second sidewall assembly 18 to provide a substantially flush finish with the sidewall of the appliance 12, while providing a protective cover over the electrical interconnect 81 and the electrical connector 86.

The second sidewall assembly 18 further includes an optical device 88 coupled to the substrate 82 and disposed adjacent the light sources 84 to receive light rays emitted from the light sources 84 and direct the light rays in a pre-determined pattern. As a non-limiting example, the optical device 88 is a lens having a plurality of annular teeth 90 formed on an inner surface facing the light sources 84. However, any optical device having any light directing feature can be used.

FIG. 15 illustrates an optical device 88' according to another embodiment of the present invention, similar to the optical device 88, except as described below. As shown, the optical device 88' is a lens having a plurality of annular teeth 90 formed on an inner surface facing the light sources 84 and a plurality of ridges 92 formed on an outer surface of the optical device 88' opposite the annular teeth 90. However, any optical device having any light directing feature can be used.

FIGS. 16-20 illustrate a third sidewall assembly 118 (i.e. lighting assembly, light assembly) according to an embodiment of the present invention similar to the second wall assembly 18, except as described below. Typically, the third sidewall assembly 118 is disposed in a locator slot 178 formed in a sidewall of the appliance 12. However, it is understood that the third sidewall assembly 118 can be disposed in any location and in any environment. As a non-limiting example, the locator slot 178 is formed adjacent a shelf channel (not shown) conventionally formed in a sidewall of the appliance 12 to receive and secure a shelf (not shown) thereto. It is understood that the locator slot 178 can be positioned in any location in the appliance 12. It is further understood that the locator slot 178 can be formed in various wall designs and configurations (e.g. a single wall molding, a dual wall molding, etc.). As a non-limiting example, the locator slot 178 has a generally square-shaped cross-section taken across a longitudinal axis thereof. As a further non-limiting example, an electrical interconnect 181 is disposed adjacent (e.g. in or nearby) the locator slot 178 to electrically couple the sidewall assembly 118 to a source of electrical energy (not shown) and other control components. In certain embodiments, at least one aperture 179 or anchor hole is formed in a wall defining the locator slot 178 to receive a coupling device (e.g. coupling device 187) to releaseably couple the third sidewall assembly 118 to the appliance 12.

As more clearly shown in FIGS. 18-20, the third sidewall assembly 118 includes a substrate 182 (e.g. circuit board) having a plurality of light sources 184 (e.g. light emitting diodes) disposed thereon. The light sources 184 are in electrical communication with an electrical connector 186 to electrically couple the light sources 184 to a source of electrical energy (not shown). As a non-limiting example, the electrical interconnect 181 is coupled to the electrical connector 186 of the third sidewall assembly 118 to energize the light sources 184. It is understood that any number of light sources 184 can be used. In certain embodiments, the substrate 182 includes a coupling feature (e.g. attachment clip) to secure the third sidewall assembly 118 to the appliance. In the embodiment shown, the substrate 182 of the third sidewall assembly 118 is configured to slide into the locator slot 178. As a non-limiting example, a coupling device 187 (e.g. attachment clip, snap-fit device, and the like) is coupled to the substrate 182 and a portion of the appliance 12 to secure the third sidewall assembly 118 to the appliance 12. As a further non-limiting example, the coupling device 187 is received by the aperture 179 and engages a portion of the appliance 12.

The third sidewall assembly 118 further includes an optical device 188 coupled to the substrate 182 and disposed adjacent the light sources 184 to receive light rays emitted from the light sources 184 and direct the light rays in a pre-determined pattern. As a non-limiting example, the optical device 188 is a lens substantially enclosing the light sources 184 and providing a substantially flush finish with the sidewall of the appliance 12. As a further non-limiting example, the optical device 188 is a lens having a plurality of annular teeth 190 formed on an inner surface facing the light sources 184. However, any optical device having any light directing feature can be used.

FIG. 21 illustrates an optical device 188' according to another embodiment of the present invention, similar to the optical device 188, except as described below. As shown, the optical device 188' is a lens having a plurality of annular teeth 190 formed on an inner surface facing the light sources 184 and a plurality of ridges 192 formed on an outer surface of the optical device 188' opposite the annular teeth 190. However, any optical device having any light directing feature can be used.

The lighting system 10 of the present invention includes optical features and lighting assemblies (e.g. the shelf assembly 12, the first sidewall assembly 16, the second sidewall assembly 18, and the third sidewall assembly 118) that provide selective lighting patterns throughout the appliance 12 while minimizing electrical power consumption. In certain embodiments, each of the assemblies 12, 16, 18, 118 is releaseably coupled to the appliance 12 and can be replaced in a modular manner.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A lighting system for an appliance comprising:
   a light shelf including a substantially planar light guide having a support member for releaseably coupling the light shelf to the appliance;
   a light injector coupled to a first end the light shelf, the light injector including a substrate having at least one light source disposed thereon and a housing for at least partially enclosing the at least one light source, wherein light emitted from the at least one light source is directed into the light guide; and
   an optical device disposed between the at least one light source and the light guide to direct light rays emitted by the at least one light source into the light guide.

2. The lighting system according to claim 1, wherein the planar light guide includes at least one light extraction feature to direct light rays through a surface of the light guide.

3. The lighting system according to claim 1, wherein the optical device is coupled to the housing of the light injector.

4. The lighting system according to claim 1, wherein the optical device is coupled to the light guide.

5. The lighting system according to claim 1, wherein at least one of the light injector and the end piece is releaseably coupled to the light shelf.

6. The lighting system according to claim 1, wherein the end piece includes a reflector for receiving light rays from the light guide and directing the light rays in a predetermined lighting pattern.

7. The lighting system according to claim 1, wherein the end piece further includes a main body coupled to the light guide and a light bar coupled to the main body, the light bar configured to direct light rays in a pre-determined lighting pattern.

8. The lighting system according to claim 1, further comprising an end piece coupled to a second end of the light shelf opposite the first end.

9. An appliance comprising:
   a plurality of walls and at least one door forming an interior of the appliance; and
   a lighting system disposed in the interior of the appliance, the lighting system including:
      at least one substantially planar light guide disposed in at least a portion of at least one of the walls of the appliance, wherein the at least one light guide includes at least one first optical feature disposed on a first surface of the at least one light guide to direct light exiting from the at least one light guide;
      a light source disposed adjacent a peripheral edge of the at least one light guide to emit light into the at least one light guide; and
      a housing disposed adjacent the at least one light guide and enclosing at least a portion of the at least one light guide, wherein light rays are emitted from the at least one light guide through an unenclosed portion of the at least one light guide.

10. The appliance according to claim 9, wherein the at least one light guide further includes at least one second optical feature disposed on a second surface of the at least one light guide to direct light toward the first optical feature.

11. The appliance according to claim 9, wherein the peripheral edge of the at least one light guide adjacent the light source has a contour to maximize a reception of light emitted from the light source.

12. The appliance according to claim 9, wherein the housing is at least partially formed from the at least one of the walls of the appliance.

13. A lighting system for an appliance comprising:
a lighting assembly configured to be releasably coupled to the appliance, the lighting assembly further including:
a substrate configured to be at least partially disposed within a locator slot formed in a portion of the appliance;
a light source coupled to the substrate; and
an optical device coupled to the substrate and disposed adjacent the light source to receive light rays emitted by the light source and direct the light rays in a pre-determined lighting pattern.

14. The lighting system according to claim 13, wherein the locator slot is generally cross-shaped in cross section.

15. The lighting system according to claim 13, further comprising a coupling device for releaseably coupling the substrate to the appliance.

16. The lighting system according to claim 13, further comprising an electrical interconnect disposed adjacent the locator slot, wherein the electrical interconnect is in electrical communication with the light source to selectively energize the light source.

17. The lighting system according to claim 16, further comprising an electrical connector disposed on the substrate to mechanically engage the electrical interconnect.

18. The lighting system according to claim 13, wherein the optical device is a lens having a pre-determined contour to direct light rays in the pre-determined lighting pattern.

19. The lighting system according to claim 13, wherein the optical device is a lens having a ridge formed thereon, the ridge facing the light source to direct light rays in the pre-determined lighting pattern.

20. The lighting system according to claim 13, wherein the optical device is a lens having a ridge formed on a surface of the optical device opposite the light source to direct light rays in the pre-determined lighting pattern.

* * * * *